(12) United States Patent
Wismeth

(10) Patent No.: US 6,405,494 B1
(45) Date of Patent: Jun. 18, 2002

(54) FIXING DEVICE FOR SOLAR MODULES

(76) Inventor: Wolfgang Wismeth, Hans-Vogel-Strasse 22, Furth D-90765 (DE)

(*) Notice: Subject to any disclaimer, the term of this patent is extended or adjusted under 35 U.S.C. 154(b) by 0 days.

(21) Appl. No.: 09/604,177

(22) Filed: Jun. 27, 2000

Related U.S. Application Data

(63) Continuation of application No. PCT/DE98/01436, filed on May 26, 1998.

(30) Foreign Application Priority Data

Sep. 30, 1997 (DE) ..................................... 297 17 449 U

(51) Int. Cl.[7] .............................................. E04D 13/18
(52) U.S. Cl. .................... 52/173.3; 52/582.1; 52/716.7; 52/718.03; 52/718.06; 52/726.1
(58) Field of Search .............................. 52/173.3, 511, 52/582.1, 716.7, 718.03, 718.04, 718.06, 726.1

(56) References Cited

U.S. PATENT DOCUMENTS

| | | | | |
|---|---|---|---|---|
| 1,760,266 A | * | 5/1930 | Carr ............................ 52/511 |
| 3,998,018 A | * | 12/1976 | Hodges ..................... 52/511 X |
| 4,261,151 A | * | 4/1981 | Ito ............................ 52/511 X |
| 4,896,992 A | * | 1/1990 | Muhlethaler ........... 52/726.1 X |
| 5,164,020 A | * | 11/1992 | Wagner et al. .......... 52/173.3 X |
| 5,195,793 A | * | 3/1993 | Maki ........................... 293/155 |
| 5,203,135 A | * | 4/1993 | Bastian ....................... 52/726.1 |
| 5,263,292 A | * | 11/1993 | Holland et al. ................ 52/235 |
| 5,359,826 A | * | 11/1994 | Grearson ............... 52/726.1 X |
| 5,419,606 A | * | 5/1995 | Hull et al. ................. 52/511 X |
| 5,571,338 A | * | 11/1996 | Kadonome et al. ..... 52/173.3 X |
| 5,697,192 A | * | 12/1997 | Inoue ........................ 52/173.3 |
| 5,762,720 A | * | 6/1998 | Hanoka et al. ......... 52/173.3 X |
| 5,876,084 A | * | 3/1999 | Smith et al. .............. 52/511 X |
| 6,075,202 A | * | 6/2000 | Mori et al. ............. 52/173.3 X |
| 6,204,443 B1 | * | 3/2001 | Kiso et al. ............. 52/173.3 X |

FOREIGN PATENT DOCUMENTS

| | | |
|---|---|---|
| DE | 30 35 841 A1 | 5/1982 |
| DE | 92 04 018.7 | 5/1992 |
| DE | 297 17 449 U1 | 1/1998 |
| NL | 8 304 155 | 7/1985 |

* cited by examiner

Primary Examiner—Beth A. Stephan
Assistant Examiner—Brian E. Glessner
(74) Attorney, Agent, or Firm—Thomas R. Vigil

(57) ABSTRACT

A solar module assembly comprising a solar module, at least one locating part in the form of a profiled rail with a longitudinally extending slot therein and a clip with a hook for fixing the solar module to the profiled rail when the clip is inserted in the slot.

11 Claims, 2 Drawing Sheets

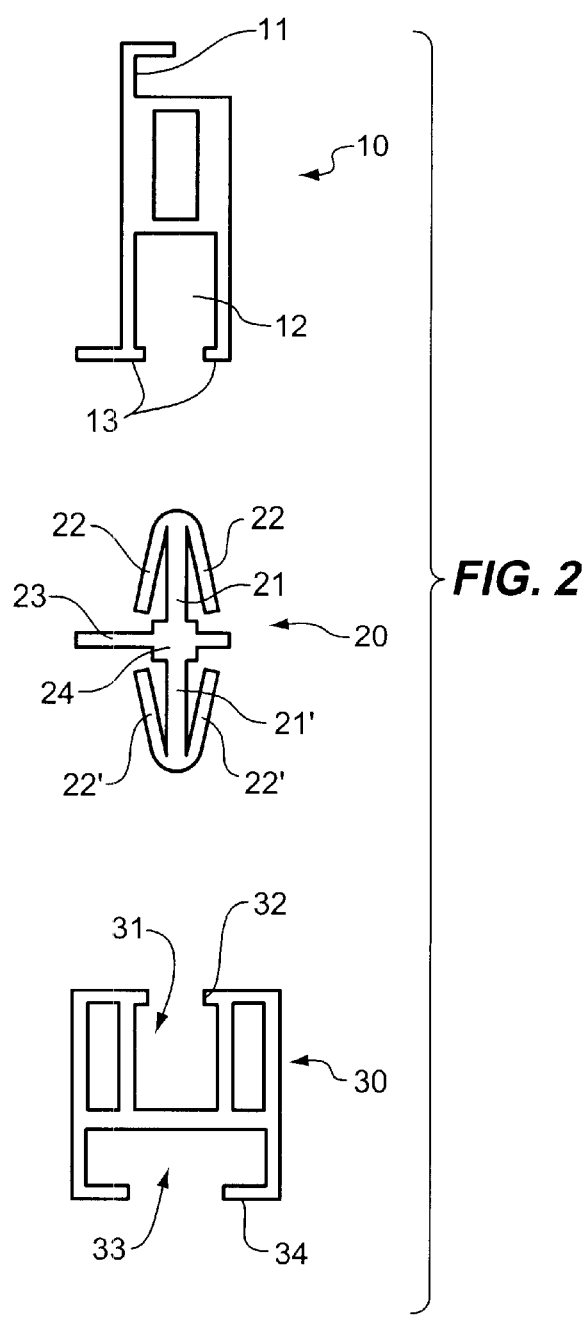
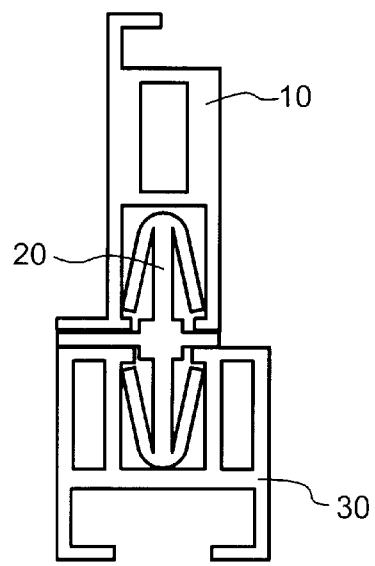
*FIG. 2*
*FIG. 3*

FIXING DEVICE FOR SOLAR MODULES

CROSS REFERENCE TO RELATED APPLICATIONS

This application is a continuation of PCT/DE 98/01436 filed May 26, 1998 which claims priority from German Patent Application No. 297 17 449.5 filed Sep. 30,1997.

BACKGROUND OF THE INVENTION

1. Field of the Invention

The invention relates to a fixing device for solar modules comprising at least one locating part for fixing on the area of application and fixing structure for fixation of solar modules to the locating part, the locating part being provided with at least one recess on its upper part facing the solar module and wherein the fixing structure comprises projecting parts, pins or hooks, which are connected to the solar module or are formed thereon and which engage the recess laterally and/or by their ends when the locating part and the solar module are assembled.

2. Description of the Prior Art

It is well known in the art to affix solar modules by means of locating parts such as profiled rails on their intended area of application. The profiled rails are provided on their underside with a through slot, so that they may be fastened with screws in a variable way on the area of application, and have on their upper side several recesses, into which the solar modules are screwed down with their frame. The solar modules are thus relatively time-consuming to install. DE-U-92 04 018 discloses such a fixing device for solar modules that consists of a locating part for attachment of a solar module thereon, whereas the locating part is provided with recesses on its upper side facing the solar module. It is therefore the object of the present invention to provide a fixing device for solar modules, by means of which said solar modules may be installed in a fast and hence economical way.

SUMMARY OF THE INVENTION

According to the invention there is provided a fixing device for solar modules comprising at least one locating part for fixing on the area of application and fixing structure for fixation of solar modules to the locating part, the locating part being provided with at least one recess on its upper part facing the solar module, wherein the fixing structure comprises projecting parts, pins or hooks, which are connected to the solar module or are formed thereon and which engage the recess laterally and/or by their ends when the locating part and the solar module are assembled.

The locating part is preferably a profiled rail, which is provided, on its upper side facing the solar module, with at least one slot arranged parallel to its longitudinal axis, whereas the fixing means engage the slot laterally and/or by their ends when the locating part and the solar module are assembled. According to an embodiment of the invention, the existing slot essentially extends over the whole length of the profiled rail. According to a particular embodiment of the invention, the profiled rail consists of two essentially identical semiprofiles that are interconnected at least at their ends by at least one connecting piece, which at least partially encompasses in a positive or non positive way the semiprofiles and which brings and maintains them in a parallel arrangement relative to one another in such a way that a longitudinal slot is formed between the semiprofiles.

The fixing means are preferably brackets made of a resilient material with bent tongues.

According to a preferred embodiment of the invention, the solar modules are provided with frame members having recesses directed toward the locating part, whereas the fixing means are projecting parts, pins, hooks or the like, which engage the recess in the frame member laterally and/or by their ends when the locating part and the solar module are assembled. In this case too, the fixing means are preferably brackets made of a resilient material with bent tongues.

According to a preferred embodiment of the invention, the fixing means are clips with two-sided effect, in which a longitudinal web extends upward and downward from a cross web, V-shaped clamping plates pointing to the cross web and made of a resilient material being arranged at their ends and terminating at some distance above the cross web, which fits the thickness of lateral webs of the recesses of the locating part or of the frame member, whereas the clamping plates engage the webs of the recesses of the locating part and of the frame member and link both of them together when they are assembled. The cross web hereby is preferably provided, additionally to the longitudinal webs, with elevations essentially matching the width of the recesses of the locating part or of the frame member between the webs and filling them out when the locating part and the frame member are assembled.

The resilient material for the fixing means may be a metal or a metal alloy or even a plastic material.

Alternatively, the fixing means may also be made of elastomer.

Advantageously, the locating part or the frame member may be provided with lateral recesses for removing the fixing means.

BRIEF DESCRIPTION OF THE DRAWINGS

FIG. 2 shows a section of fixing structure of a second embodiment of a fixing device for solar modules when locating part and frame member are disassembled;

FIG. 3 shows the fixing structure of FIG. 2 with the locating part and the frame member in an assembled arrangement.

DESCRIPTION OF THE PREFERRED EMBODIMENT(S)

Figure 1:
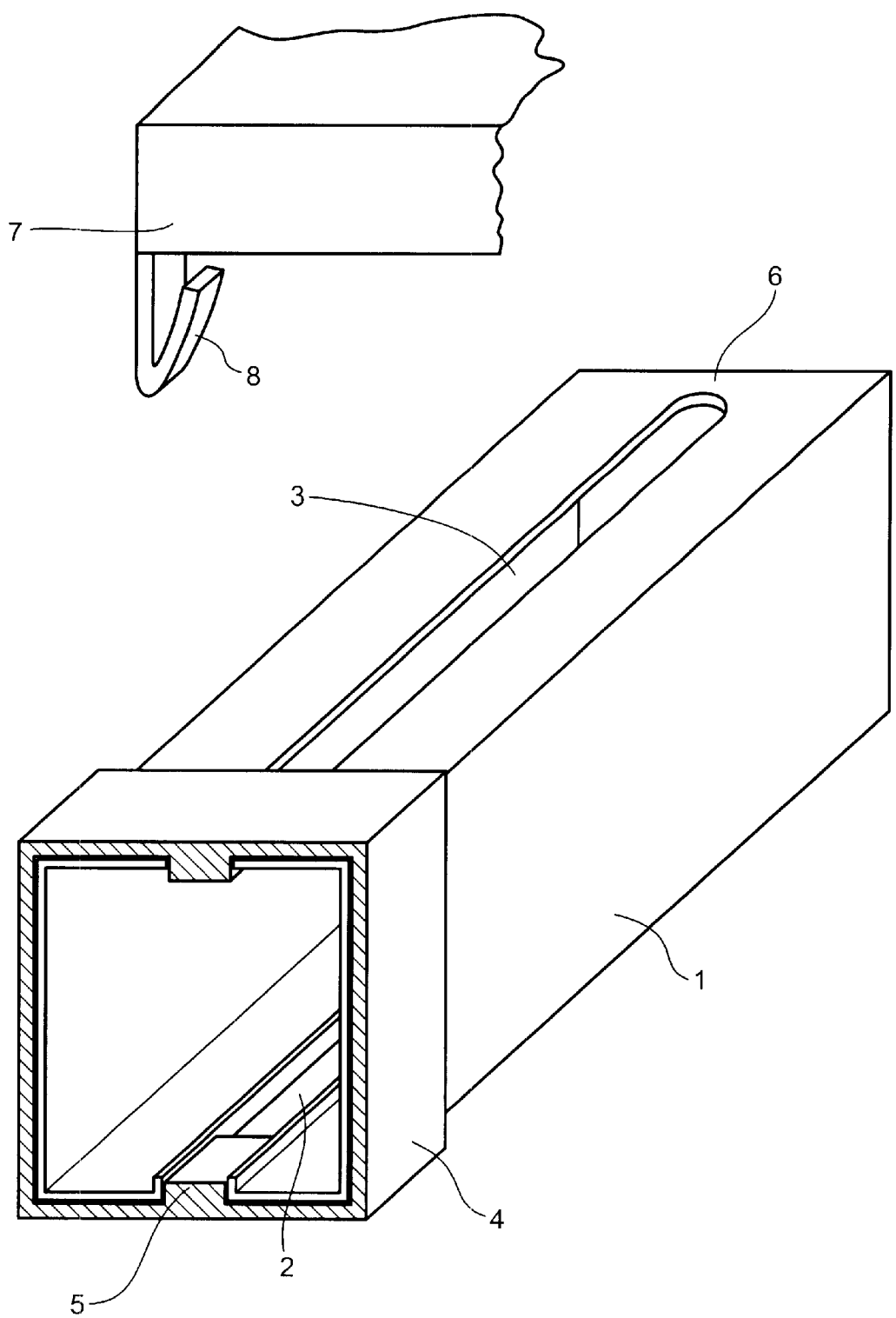
FIG. 1 shows a first embodiment of a fixing device for solar modules.

The fixing device of FIG. 1 for solar modules according to the invention consists of a profiled rail 1 with a lower fastening slot 2 and with an upper slot 3, into which a fastening hook 8 having a resilient tongue and being arranged underneath the frame 7 of a solar module may be inserted, whereas the resilient tongue jams laterally at the side of the slot beneath the profiled rail when the locating part and the solar module are assembled. The fastening slot, by means of which the profiled rail is affixed on the area of application in the well known way, extends over the whole length of the profiled rail. Therefore, said profiled rail must have connecting webs 6 at least at its end, as shown here in the upper area of the drawing.

Alternatively, the profiled rail 1 may consist of two separate semiprofiles that are held together by one or several connecting pieces 4. The connecting piece 4 shown here in the lower area of the drawing has the shape of a frame and is rectangular in cross-section. It positively encompasses the two semiprofiles and is provided with two spacers 5 having the same size, one of which engages the lower fastening slot 2 and the other engages the upper slot 3, so that the two half-rails are forming both slots between the two of them and that they are maintained in a parallel arrangement relative to one another. Such connecting pieces are preferably located at either end of a profiled rail. The use of such connecting pieces has the advantage that the half rails may always be cut to the desired length and that dismounting may be easier by pulling the connecting piece off and by simply pulling the solar module together with its fixing means out along the profiled rail. In this embodiment, the tongue of the fastening hook 8 must not be resilient, since the solar module may be pushed onto the profiled rail in the same way. In case of webs located at the end, dismounting is only possible by pressing the resilient tongue together, a tool being needed for this operation.

FIG. 2 and 3 show a locating part 30 and a frame member 10 that are assembled by means of a fixing means 20. The locating part 30 is a profiled rail that is rectangular in cross-section and that has a lower recess 33 laterally rimmed by webs 34, behind which fixing means such as screws (not shown) may rest for installation on the area of application. Furthermore, the locating part 30 is provided at its top with another recess 31, which also has webs 32 projecting laterally. The frame member 10 of a solar module (not shown) is a profiled rail too, which is essentially rectangular in cross section, but which is smaller than the locating part. It is provided at its bottom with a recess 12 having webs 13 projecting laterally and having the same dimensions as the upper recess 31 of the locating part 30. The left web 13 in the drawing is prolonged outward beyond the rectangular cross section. On the top, the frame member 10 first has a vertical profile section 11, which then bends to the horizontal plane, the glass plate of the solar module being held in said profile section. The fixing means 20 is a hook provided with resilient tongues 22 on either side, the length of said hook only being a fraction of the length of the profiled rails 10, 20 and said hook being used in an appropriate number in order to safely connect the profiled rails to one another. It has a cross web 23, from which longitudinal webs extend vertically downward and upward, resilient tongues extending on either side diagonally therefrom outward toward the cross web. The length of the longitudinal webs 21 and the angle of the tongues 22 is so designed that, when the profiled rails 10, 20 are assembled, the tongues are introduced into the recesses 12 and 33 and are pressed together, expanding inside the recesses 12 and 33 and jamming behind the webs 13 and 34, as may be seen in FIG. 3. The cross web is thickened in its central part so as to form a rectangular profile, its width matching the width of the openings of the recesses 12 and 33, so that they are essentially filled out by the rectangular profile when the profiled rails 10, 30 and the fixing means 20 are assembled. The cross web 23 of the fixing means 20 is lengthened on one side so that it extends over the width of the frame member in order to give the assembled kit a closed contour.

I claim:

1. A solar module assembly comprising a solar module, at least one locating part and means for fixing the solar module to said locating part (1), the locating part (1) being provided with at least one recess (3) on its upper part facing the solar module, wherein said locating part is a profiled rail (1) which is provided, on its upper side facing the solar module, with at least one slot (3) arranged parallel to its longitudinal axis and defining said recess (3), said fixing means comprises a clip with a hook, which are one of connected to or formed on the solar module and which engage the recess when the recess in the locating part is engaged by the fixing means and said solar modules include frame members (10), the frame members having recesses (12) directed toward the locating part (30), and said fixing means engage the recess (12) in the frame member (10) when the recesses in the locating part (30) are engaged by the fixing means.

2. The solar module assembly according to claim 1, wherein the slot essentially extends over the whole length of the profiled rail.

3. The solar module assembly according to claim 1, wherein the profiled rail comprises two essentially identical semi-profiles that are interconnected, at least at their ends, by at least one connecting piece (4), which at least partially encompasses the semi-profiles and which brings and maintains them in a parallel arrangement relative to one another in such a way that a longitudinal slot is formed between the semi-profiles.

4. The solar module assembly according to claim 1, wherein the fixing means are clips made of a resilient material with bent tongues which form hooks.

5. The solar module assembly according to claim 1, wherein the fixing means are clips (21) made of a resilient material with bent tongues (22) which form hooks.

6. The solar module assembly according to claim 5, wherein the fixing means (20) comprise mirror image clips each defined by a longitudinal web (21) which extends outwardly from a cross web (23) to an outer end, V-shaped clamping plates (22) extending from the outer end and pointing toward the cross web, forming hooks, and being made of a resilient material, said clamping plates terminating at a distance above the cross web (23), which distance is greater than the thickness of lateral webs of the recesses of one of the locating part (30) or the frame member (10), whereby the clamping plates engage the lateral webs (13, 33) of the recesses (12, 33) of the locating part and of the frame member and link both of them together when the clips are received in the recesses.

7. The solar module assembly according to claim 6, wherein the cross web (23) is provided, additionally to the longitudinal webs (21), with elevations essentially matching the width of the recesses (12, 31) of one of the locating part or the frame member between the webs (13, 34) and filling the recesses when the locating part and the frame member are fixed together.

8. The solar module assembly according to claim 4 wherein the resilient material is one of a metal or a metal alloy.

9. The solar module assembly according to claim 4, wherein the resilient material is a plastic material.

10. The solar module assembly according to claim 1, wherein the fixing means are made of an elastomer.

11. A solar module assembly comprising a solar module, at least one locating part and means for fixing the solar module to said locating part (1), the locating part (1) being provided with at least one recess (3) on its upper part facing the solar module, wherein said locating part is a profiled rail (1) which is provided, on its upper side facing the solar module, with at least one slot (3) arranged parallel to its longitudinal axis and defining said recess (3), said fixing means comprises a clip with a hook, which are one of connected to or formed on the solar module and which engage the recess when the recess in the locating part is engaged by the fixing means and one of the locating part or a frame member of the solar module are provided with lateral recesses for removing the fixing means.

* * * * *